US012172660B2

(12) United States Patent
Samani et al.

(10) Patent No.: US 12,172,660 B2
(45) Date of Patent: Dec. 24, 2024

(54) METHOD AND SYSTEM FOR COLLABORATIVE TASK-BASED ALLOCATION BETWEEN HUMAN AND AUTONOMOUS SYSTEMS

(71) Applicant: UNITED STATES OF AMERICA AS REPRESENTED BY THE ADMINISTRATOR OF NASA, Washington, DC (US)

(72) Inventors: Saeideh E. Samani, Williamsburg, VA (US); Richard K. Jessop, Hampton, VA (US); Angela R. Harrivel, Poquoson, VA (US); Chad L. Stephens, Poquoson, VA (US); Alan T. Pope, Poquoson, VA (US); Kellie D. Kennedy, Poquoson, VA (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 441 days.

(21) Appl. No.: 17/685,027

(22) Filed: Mar. 2, 2022

(65) Prior Publication Data

US 2022/0306143 A1 Sep. 29, 2022

Related U.S. Application Data

(60) Provisional application No. 63/156,259, filed on Mar. 3, 2021.

(51) Int. Cl.
*B60W 50/00* (2006.01)
*B60W 40/08* (2012.01)
(Continued)

(52) U.S. Cl.
CPC ............ *B60W 50/14* (2013.01); *B60W 40/08* (2013.01); *B60W 60/001* (2020.02); *B60W 2040/0818* (2013.01); *B60W 2050/0001* (2013.01)

(58) Field of Classification Search
CPC .... B60W 50/14; B60W 60/001; B60W 40/08; B60W 2040/0818; B60W 2050/0001
(Continued)

(56) References Cited

U.S. PATENT DOCUMENTS

| 4,337,049 A | 6/1982 | Connelly |
| 4,508,510 A | 4/1985 | Clifford |

(Continued)

FOREIGN PATENT DOCUMENTS

CN 113288174 B 8/2022

OTHER PUBLICATIONS

Stephens, C., et al., "Crew State Monitoring and Line-Oriented Flight Training for Attention Management," 19th International Symposium on Aviation Psychology (ISAP 2017), pp. 1-6.

(Continued)

*Primary Examiner* — Mahmoud S Ismail
(74) *Attorney, Agent, or Firm* — Matthew R. Osenga; Robin W. Edwards; Trenton J. Roche

(57) ABSTRACT

A dynamic function allocation (DFA) framework balances the workload or achieves other mitigating optimizations for a human operator of a vehicle by dynamically distributing operational functional tasks between the operator and the vehicle's or robot's automation in real-time. DFA operations include those for aviation, navigation, and communication, or to meet other operational needs. The DFA framework provides an intuitive command/response interface to vehicle (e.g., aircraft), vehicle simulator, or robotic operations by implementing a Dynamic Function Allocation Control Col-
(Continued)

laboration Protocol (DFACCto). DFACCto simulates or implements autonomous control of robot's or vehicle's functional tasks and reallocates some or all tasks between a human pilot and an autonomous system when such reallocation is preferred, and implements the reallocation. The reallocation is implemented in the event of the human's distraction or incapacitation, in the event another non-nominal or non-optimal cognitive or physical state is detected, or when reallocation need is otherwise-determined.

20 Claims, 6 Drawing Sheets

(51) Int. Cl.
  *B60W 50/14* (2020.01)
  *B60W 60/00* (2020.01)
(58) Field of Classification Search
  USPC .......................................................... 701/36
  See application file for complete search history.

(56) References Cited

U.S. PATENT DOCUMENTS

| | | |
|---|---|---|
| 5,377,100 A | 12/1994 | Pope |
| 5,626,140 A | 5/1997 | Feldman |
| 5,697,791 A | 12/1997 | Nashner |
| 5,702,323 A | 12/1997 | Poulton |
| 5,743,744 A | 4/1998 | Cassily |
| 5,907,819 A | 5/1999 | Johnson |
| 5,947,868 A | 9/1999 | Dugan |
| 5,984,684 A | 11/1999 | Brostedt |
| 6,067,468 A | 5/2000 | Korenman |
| 6,093,146 A | 7/2000 | Filangeri |
| 6,104,948 A | 8/2000 | Bogart |
| 6,126,449 A | 10/2000 | Burns |
| 6,132,337 A | 10/2000 | Krupka |
| 6,148,280 A | 11/2000 | Kramer |
| 6,167,298 A | 12/2000 | Levin |
| 6,212,427 B1 | 4/2001 | Hoover |
| 6,240,309 B1 | 5/2001 | Yamashita |
| 6,259,889 B1 | 7/2001 | LaDue |
| 6,261,189 B1 | 7/2001 | Saville |
| 6,277,030 B1 | 8/2001 | Baynton |
| 6,425,764 B1 | 7/2002 | Lamson |
| 6,450,820 B1 | 9/2002 | Palsson |
| 6,463,365 B1 | 10/2002 | Anagnost |
| 6,463,385 B1 | 10/2002 | Fry |
| 6,478,735 B1 | 11/2002 | Pope |
| 6,491,647 B1 | 12/2002 | Bridger |
| 6,527,700 B1 | 3/2003 | Manico |
| 6,682,351 B1 | 1/2004 | Abraham-Fuchs |
| 6,774,885 B1 | 8/2004 | Even-Zohar |
| 6,778,866 B1 | 8/2004 | Bettwy |
| 6,786,730 B2 | 9/2004 | Bleckley |
| 7,570,991 B2 | 8/2009 | Milgramm |
| 7,621,871 B2 | 11/2009 | Downs, III |
| 7,933,645 B2 | 4/2011 | Strychacz |
| 8,062,129 B2 | 11/2011 | Pope |
| 8,164,485 B2 | 4/2012 | Prinzel, III |
| 8,356,004 B2 | 1/2013 | Jung |
| 8,628,333 B2 | 1/2014 | Prinzel, III |
| 8,827,717 B2 | 9/2014 | Pope |
| 8,858,323 B2 | 10/2014 | Nguyen |
| 8,858,325 B2 | 10/2014 | Pope |
| 9,084,933 B1 | 7/2015 | Pope |
| 9,104,948 B2 | 8/2015 | Scheuer |
| 9,498,704 B1 | 11/2016 | Cohen |
| 9,848,812 B1 | 12/2017 | Harrivel |
| 10,332,245 B1 | 6/2019 | Price |
| 10,796,246 B2 | 10/2020 | Gupta |
| 10,958,512 B2 | 3/2021 | Soon-Shiong |
| 11,017,339 B2 | 5/2021 | Rocco |
| 11,151,883 B2 | 10/2021 | Kline |
| 2003/0013071 A1 | 1/2003 | Thomas |
| 2003/0013072 A1 | 1/2003 | Thomas |
| 2003/0087220 A1 | 5/2003 | Bessette |
| 2003/0139654 A1 | 7/2003 | Kim |
| 2005/0014113 A1 | 1/2005 | Fleck |
| 2008/0081692 A1 | 4/2008 | Pope |
| 2009/0082692 A1 | 3/2009 | Hale |
| 2010/0185113 A1 | 7/2010 | Peot |
| 2010/0292545 A1 | 11/2010 | Berka |
| 2011/0009777 A1 | 1/2011 | Reichow |
| 2011/0161011 A1 | 6/2011 | Hasson |
| 2012/0212353 A1 | 8/2012 | Fung |
| 2012/0289869 A1 | 11/2012 | Tyler |
| 2012/0316793 A1 | 12/2012 | Jung |
| 2018/0096614 A1 | 4/2018 | Pradeep |
| 2020/0198465 A1* | 6/2020 | Tanabe ..................... G08G 1/00 |
| 2020/0302825 A1 | 9/2020 | Sachs |
| 2021/0107530 A1* | 4/2021 | Buerkle .............. G06F 21/6272 |
| 2023/0094154 A1* | 3/2023 | Fields .................. G05D 1/0061 701/23 |
| 2024/0043015 A1* | 2/2024 | Fields ................... B60W 40/09 |

OTHER PUBLICATIONS

Harrivel, et al., "Crew State Monitoring (CSM) and Trust in Humans (TIH), " NASA Langley Research Center Presentation Slides, Crew System and Aviation Operations Peer Review, Jan. 27, 2016, pp. 1-63, Hampton, VA.
Zacharias, Greg, "Autonomous Horizons: The Way Forward, vol. 2, Human Autonomy Teaming," United States Department of Defense, United States Air Force, Maxwell Air Force Base, Zacharias, Al: Air University Press, Jan. 2019 (Public Release Case No. 2015-0267), pp. xxi-xxix, 16-23, 97-116 and 241-244.
Dr. Ray Comstock, et al., Commercial Aviation Safety Team, "Airplane State Awareness (ASA) Joint Safety Analysis Team (JSAT) Report," Jun. 17, 2014, pp. 1-16.
Harrivel, A., et al., "A Comparative EEG Sensor Analysis for Attentional State Prediction," AsMA 2018, Sensors and Symptoms: Research in Physiological Events, May 7, 2018, pp. 1-26.
Harrivel, A., et al., fNIRS Feature Importance for Attentional State Prediction. Extended abstract accepted to the 2nd International Neuroergonomics Conference. Jun. 27-29, 2018, Philadelphia, PA, pp. 1-4.
Harrivel, A. R., et al., "Monitoring attentional state with fNIRS," Frontiers in Human Neuroscience, Dec. 2013, pp. 1-11.
Harrivel, A, R., et al., "Dynamic filtering improves attentional state prediction with fNIRS," Biomed, Optics Express, 2016, vol. 7 No. 3, pp. 1-24.
Harrivel, A. R., et al., "Psychophysiological Sensing and State Classification for Attention Management in Commercial Aviation," AIAA SciTech Forum, Jan. 4-8, (AIAA 2016-1490), San Diego, California, pp. 1-8.
Pope, A. T., et al., "Biocybernetic System Validates Index of Operator Engagement, in Automated Task," Biological Psychology, May 1995, pp. 187-195, vol. 40, Issues 1-2.
Stephens, C. L., et al., "Adaptive Automation for Mitigation of Hazardous States of Awareness," The Handbook of Operator Fatigue, 2012, Chapter 26, pp. 416-439.

* cited by examiner

METHOD AND SYSTEM FOR COLLABORATIVE TASK-BASED ALLOCATION BETWEEN HUMAN AND AUTONOMOUS SYSTEMS

CROSS-REFERENCE TO RELATED PATENT APPLICATION(S)

This patent application claims the benefit of and priority to U.S. Provisional Patent Application No. 63/156,259, filed on Mar. 3, 2021, the contents of which is hereby incorporated by reference in its entirety for any and all non-limiting purposes.

This patent application cross-references U.S. Pat. No. 10,997,526 and related U.S. patent application Ser. No. 17/307,639 both entitled System and Method for Human Operator and Machine Integration, and U.S. Pat. No. 10,192,173 entitled System and Method for Training of State-Classifiers, which are incorporated herein by reference in their entireties for any and all non-limiting purposes.

STATEMENT REGARDING FEDERALLY SPONSORED RESEARCH OR DEVELOPMENT

The invention described herein was made in the performance of work under a NASA contract and by employees of the United States Government and is subject to the provisions of Public Law 96-517 (35 U.S.C. § 202) and may be manufactured and used by or for the Government for governmental purposes without the payment of any royalties thereon or therefore. In accordance with 35 U.S.C. § 202, the contractor elected not to retain title.

BACKGROUND

The concept of Urban Air Mobility (UAM) envisions a safe and efficient aviation transportation system that will use highly (and even fully) automated aircraft which will operate and transport passengers or cargo at low altitudes within urban and suburban areas. By way of example, the National Aeronautics and Space Administration (NASA) is developing a framework to integrate UAM, including an automated electrical Vertical Take-Off and Landing aircraft (e-VTOL) with a capacity of various quantities of passengers. Ideally, UAM will include an ecosystem that considers the evolution and safety of the aircraft, the framework for operation, access to airspace, infrastructure development, and community engagement. The idea of shared mobility services has emerged to not only alleviate demand for parking spaces, but also to adjust vehicle ownership and environmental impacts. This interest has been reflected in aviation.

Similarly, the concept of Advanced Air Mobility (AAM) builds upon the UAM concept by incorporating use cases not specific to operations in urban environments, e.g., moving people and cargo between places previously not served or underserved by aviation at local, regional, intraregional, urban levels. A significant economic barrier or drag on the introduction of these concepts is the cost of an onboard human vehicle operator. Most current commercial transport flights require two licensed pilots.

In parallel with the push for a viable UAM system, space exploration and travel also remain one of the next great frontiers. The vehicles required to support missions to the moon, Mars and beyond will depend on advanced technologies, including autonomous systems.

For UAM vehicle operations to be economically viable, there must be a migration path that simultaneously increases public trust and confidence with UAM operations and, in certain instances, reduces the number of operators to one, while in others, it is envisioned that the remaining human operator will be replaced with a fully autonomous flight control system.

UAM hazard and risk management as well as contingency management must be considered. In the UAM world, there is a need for the responsibility to manage the situation and assist the pilot, similar to dispatchers, as they support pilots in the current airspace. Furthermore, there is a need for a framework to manage response to emergencies in UAM operations where the pilot is no longer able to manage the situation with ground-based support.

A significant step towards single pilot and even fully autonomous flight control is to manage the current intersection between human operators, e.g., human pilots, and automation technology. Such questions include which should have ultimate authority over the system, e.g., aircraft, and does the answer change depending on the circumstance? Specifically, how does a shared system account for human performance degradation, such as, for example, fatigue, startle response, distraction, and/or incapacitation. Most of the research in human-autonomy teaming is about the need for humans to take over control or the implementation of a plan and make decisions in critical situations or to return the control initiatives to humans when the automated subtask is complete. In recent years, interoperability between human and automation has been referenced in the literature as Human-Autonomy Teaming (HAT). Most existing studies agree that humans should be the final authority in HAT systems and always have the supervisory responsibility. However, systems and methods which subjectively favor humans in decision making scenarios could increase human error due to situational awareness issues, or a lack of trust in automation. Although discussed herein with reference to flight and flight simulation embodiments, HAT systems and processes are applicable to any and all human-autonomy teaming scenarios, e.g., robots, autonomous vehicles and crafts and other autonomous systems.

Prior art systems for managing human-autonomy interoperability include the Multi-modal Immersive Intelligent Interface for Remote Operation (MIIIRO) and the Autonomous Constrained Flight Planner (ACFP). Multi-modal Immersive Intelligent Interface for Remote Operation (MIIIRO) has the ability for either manual or automatic modes. The design also includes visualization modes to help situational awareness. The operator can update the plan in emergency scenarios and when necessary. One such mode is a tactical situation display, which is a method of alerting the operator on contingencies. Autonomous Constrained Flight Planner (ACFP) is a recommender system that supports rapid diversion decisions for commercial pilots in non-normal situations. These prior art systems do not invoke intelligent automated systems, nor do they allow for dynamic, moment-by-moment or continuous, function-by-function task assignment and re-assignment as envisioned herein.

Psychophysiological sensors have been used in different studies to predict emotional and cognitive states of the body such as workload, attention, and awareness. There are different types of wireless psychophysiological sensors available for such studies. Attention-related human performance limiting states (AHPLS) is one of the methods of safety enhancement called "Training for Attention Management." The prediction of AHPLS has been studied by applying psychophysiological sensors and collecting data from a human subject study conducted in a flight simulator. Communicating information regarding the status of the operator to the autonomous system can help guide the selection of contingency plans for a more graceful transfer of control when the human needs to recover, thus reducing some of the costs associated with HAT.

Crew State Monitoring System (CSM) software has been designed and developed that uses a broad range of sensors to measure psychophysiological activity of the body in high-fidelity flight simulation studies in real-time. By way of example, U.S. Pat. No. 10,997,526 ("the '526 patent"), incorporated by reference in its entirety, describes one or more embodiments which evaluate and determine a cognitive state of an operator and allocate tasks to either a machine and/or human operator based on, inter alia, the operator's cognitive state. Disclosed embodiments utilize trained multistate classifiers to classify an operator's cognitive state using the sensor data. U.S. Pat. No. 10,192,173 ("the '173 patent), incorporated by references in its entirety, describes exemplary classifiers. And Stephens, C. et al., Crew State Monitoring and Line-Oriented Flight Training for Attention Management, 19th International Symposium on Aviation Psychology (ISAP 2017), together with Harrivel, A., et al., Prediction of Cognitive States during Flight Simulation using Multimodal Psychophysiological Sensing, American Institute of Aeronautics and Astronautics SciTech Forum (AIAA SciTech 2017), describe an embodiment of a CSM system and are incorporated herein by reference. This software supports aviation training methods to reduce accidents and incidents, many of which involve flight crew distractions due to diverted and channelized attention.

To this point, the prior art systems and methods have been fairly limited in scope and application. Generally confined to a laboratory setting, most studies are based on action or execution simulations with a moderate level of difficulty. Further, most of the prior art studies address partially—not highly—autonomous systems. Prior art systems currently employ an "all or none" predetermined approach to switching a task from human operator to an autonomous system. There is no HAT collaboration as all actions are predetermined.

Accordingly, while the prior art has made a number of strides in the area of human-autonomy interoperability management, there remains much work to be done to achieve seamless, real-time responsiveness for efficient, safe and dynamic allocation of tasks in difficult scenarios with highly autonomous systems. In order to achieve the envisioned UAM system and to support space-based missions, the vehicular technology, simulated and live, needs to evolve to implement collaborative task-based allocation and re-allocation between pilot/operator and autonomous systems. The disclosed embodiments address one or more of these and/or other needs of in the art.

BRIEF SUMMARY

Aspects of this disclosure relate to a dynamic function allocation platform. One embodiment a platform may implement a Dynamic Function Allocation Control Collaboration Protocol (DFACCto) which may simulate or implement autonomous control of a vehicle, e.g., aircraft, in the event of the human pilot's distraction or incapacitation or otherwise determines that reallocation of some or all tasks between a human pilot and autonomous system may be preferred. In certain embodiments, a system may implement the reallocation or a portion thereof.

In certain implementations, a platform may simulate or implement a partial or full autonomous control based on a determination that a human operator or pilot is impaired (but not incapacitated). In one embodiment, the simulation or implementation to be enacted may be based on a type and/or severity of the determined impairment. In one example, an impairment selection and/or severity selection is electronically selected from a plurality of possible selections. The simulation or implementation to be enacted for a first impairment is distinct from the simulation or implementation for a second impairment. In other embodiments, the simulation or implementation to be enacted for a first severity level of a first impairment may be distinct from the simulation or implementation for a second severity level of a second impairment. In this regard, although certain embodiments described herein may be described in terms of detecting/determining either an impairment or an incapacitation, such embodiments should be interpreted as covering one or both possibilities absent explicit or logical prohibition of such an interpretation.

One embodiment comprises a method of allocating one or more tasks to one or both of a human operator and one of an automated, autonomous (or semi-autonomous system). The method may comprise: determining, by a first processor, a first cognitive or physical state of the human operator at a first time $T_1$; determining, by the first processor based on the first cognitive or physical state, that a change in task allocation between the human operator and the one of an automated, autonomous or semi-autonomous system is required; providing, by the first processor, a first data packet containing the determination of the first cognitive state of the human operator and first instructions to implement a change in task allocation to a processor-based communications controller to implement the change in task allocation; receiving, at the processor-based communications controller, the first packet from the first processor and i. confirming receipt of the first packet to the first processor, ii. parsing the first packet to retrieve the first cognitive or physical state and the first instructions, iii. providing a second packet including instructions for generating a visual indication of the first cognitive or physical state and a request to implement the first instructions to a processor-based vehicle control system, wherein the processor-based vehicle control system includes a visual user interface and the one of an automated, autonomous or semi-autonomous system;

receiving, at the processor-based vehicle control system, the second packet from the processor-based communications controller and iv. parsing the second packet to retrieve the instructions for generating a visual indication of the first cognitive or physical state and the request to implement the first instructions, v. displaying the visual indication of the cognitive or physical state on the visual user interface, vi. processing the request to implement the first instructions, and vii. implementing the first instructions, including the change to task allocation.

Other embodiments may include a system for allocating one or more tasks to one or both of a human operator and one of an automated, autonomous, or semi-autonomous system. The system may comprise: a first processor for receiving physiological or psychophysiological sensor data for the human operator and determining a cognitive or physical state of the human operator at a time $T_1$ and determining if the human operator's cognitive or physical state at time $T_1$ the requires a change task allocation between the human operator and the one of an automated, autonomous or semi-autonomous system; a processor-based control system, including manual or other human-interface controls operable by the human operator and or the one of an automated, autonomous or semi-autonomous system; a processor-based communications controller for facilitating communications between the first processor and the processor-based control system in accordance with a predetermined protocol, wherein the communications include instructions to implement one or more changes in task allocation between the human operator and the one of an automated, autonomous or semi-autonomous system, based on the cognitive or physical state of the human operator.

Yet another embodiment of the invention may comprise a processor-based controller for implementing a dynamic function allocation control collaboration protocol within a vehicle or robotic control environment. The processor-based controller comprises: programmed instructions for receiving data packets in a first format containing the determination of a cognitive or physical state of a human operator within the vehicle or robotic control environment and instructions to implement a change in task allocation between the human operator and one of an automated, autonomous or semi-autonomous system within the vehicle or robotic control environment; programmed instructions for confirming receipt of data packets in the first format to the sending entity and parsing the data packet to retrieve the cognitive or physical state and the instructions, programmed instructions for preparing data packets in a second format including instructions for generating a visual indication of the cognitive or physical state and a request to implement the instructions and for sending the data packets in the second format to a vehicle or robotic control system of the vehicle or robotic control environment; programmed instructions for confirming receipt of data packets in the second format by the vehicle or robotic control system and at least one of confirmation of implementation of the change in task allocation between the human operator and the one of an automated, autonomous or semi-autonomous system or an indication that the change in task allocation is not going to be implemented by the vehicle or robotic control system.

These and other features, advantages, and objects of the present invention will be further understood and appreciated by those skilled in the art by reference to the following specification, claims, and appended drawings.

BRIEF DESCRIPTION OF THE SEVERAL VIEWS OF THE DRAWINGS

Various example embodiments may be more completely understood in consideration of the following detailed description in connection with the accompanying drawings, in which.

DETAILED DESCRIPTION

Successful introductory UAM integration into the National Airspace System (NAS) will be contingent on resilient safety systems that support reduced-crew flight operations. UAM vehicles will necessarily incorporate and rely, at least to some extent, on autonomous components and processes. The ability to actively manage the assignment of vehicle operation tasks between human operators and autonomous components is critical to moving transportation both on earth and in space to the next level.

Various systems described herein may perform three interconnected functions: 1) monitor an operator or pilot's physiological state; 2) assesses when the operator is experiencing one or more anomalous states; and 3) mitigate risks by a combination of dynamic, context-based unilateral or collaborative dynamic function allocation of operational tasks. At a high level, a monitoring process may receive high data-rate sensor values from psychophysiological sensors, e.g., eye-tracking, electrocardiogram, electroencephalography, amongst others. An assessment process may obtain these values or derivatives thereof and perform a classification. In one embodiment, a classification may be developed using machine learning algorithms. A mitigation process may invoke a collaboration protocol, which may be referred to as a DFACCto protocol, which, based on context, causes one or more autonomous operation modules to perform one or more tasks that the human operator or pilot would otherwise routinely execute absent implementation of the protocol.

Figure 1:
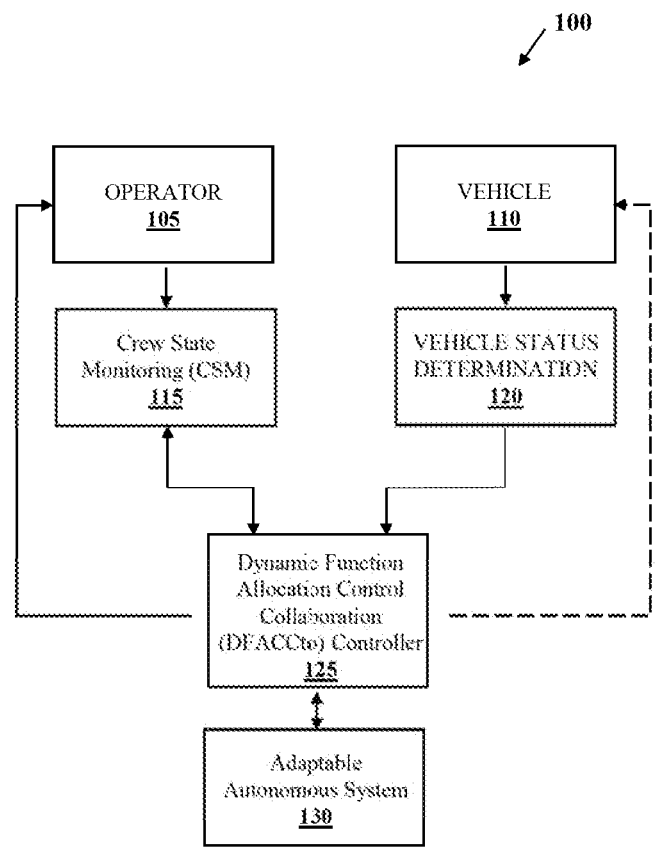
FIG. 1 is a high level block diagram of a system for operator status determination and task allocation, consistent with various embodiments of the present disclosure.

FIG. 1 provides a high level block diagram of the system 100 of certain illustrated embodiments. At base, the system 100 includes one or more human operators 105, a vehicle (may be physical vehicle or a partial or fully-simulator vehicle) 110, a crew state monitoring (CSM) module 115, a vehicle status determination module 120, a DFACCto module 125, and an adaptable autonomous system 130. FIG. 1 is not intended to limit the system. One skilled in the art recognizes that additional components, modules, subsystems, systems and functionality may be added to the system and/or combined with those identified in FIG. 1. Additionally, certain components and/or functionality shown separately, may be consolidated in a single processor and/or physical manifestation. For example, although illustrated separately, the adaptable autonomous system 130 may be part of the vehicle 110. In the case of simulator embodiments, the vehicle may be a vehicle simulator, which one skilled in the art will recognize may have different configurations and components to simulate desired situations. The interconnected functions referenced above are applicable to both simulation and real-world operations. Certain alternative and exemplary embodiments are further described herein.

Embodiments expand on the existing art and provide for incorporation of an additional psychophysiological sensor for collection of human eye-tracking data and use thereof to determine function allocation. Additionally, one or more embodiments describe improved communication methods between components of HAT systems which guide the selection and implementation of contingency plans for efficient sharing or transfer of control when the human operator needs to recover, thus reducing some of the costs associated with HAT. Further, a novel Dynamic Function Allocation (DFA) framework balances the workload for a human operator of a vehicle by dynamically distributing operations between the operator and the vehicle's automation in real-time, or enables other optimization such as for safety or efficiency or progress toward a shared HAT goal or intent, by dynamically distributing operational and functional tasks between the operator and the vehicle's automation in real-time. DFA operations include those for aviation, navigation, and communication and/or for other operational needs. The DFA framework provides an intuitive command/response interface to vehicle operations that is accessible with the least possible dependency on software engineering expertise. Lastly, a Dynamic Function Allocation Control Collaboration Protocol (DFACCto) may be implemented to invoke (or simulate) autonomous or semi-autonomous control of a vehicle, e.g., aircraft, responsive to, e.g., crew state monitoring and vehicle status data.

In certain embodiments, the invocation of one or more of these novel aspects (including the combination thereof) support real-time decisions regarding some or all functional task allocation based on the pilot/operator's state and/or allows some or all of the tasks to be reallocated back to the user with criteria. This is distinguished from a binary, predetermined takeover of all of the operator's operational tasks. The ability to dynamically allocate and re-allocate tasks between human operator and autonomous components responsive to continuous monitoring of the pilot/operator's cognitive and/or physical state is a significant advance towards the envisioned UAM.

Initially, embodiments may employ physiological monitoring systems which implement machine learning algorithms for cognitive state prediction based on physiological data acquired from sensors in real-time. Cognitive state prediction may include the identification of sub-optimal states, e.g., high/low workload, channelized attention, diverted attention, startle/surprise, crew impairment and/or incapacitation or variations thereof.

Cognitive state can be a significant factor effecting efficiency and safety in operation of various systems and/or vehicles. Evaluation of cognitive state may be useful to facilitate operator training and/or enhance operability for a number of applications. Cognitive activity is associated with various physiological responses exhibited by an operator/pilot. In certain implementations, cognitive state may be inferred from various sources of physiological data including, for example, sensors measuring electroencephalogram (EEG), event-related potentials (ERP), functional near infrared spectroscopy (fNIRS), electrocardiogram (EKG), heart rate, blood pressure, respiration rate, skin temperature, galvanic skin response (GSR), electromyogram (EMG), pupil dilation, eye movement, gaze point, voice stress analysis (e.g., based on vocal timbre), and/or facial feature readings.

Evaluation of cognitive state can be challenging as physiological responses of an operator in a particular cognitive state may vary from person to person. To ensure accurate classification, state-classifiers may be used in certain embodiments herein. In one embodiment, state-classifiers may be individually trained for each operator/pilot to map the particular physiological responses of the operator to the set of target cognitive states or thresholds. As described in, for example, the '173 patent, cognitive state classifiers may be trained using a system configured to present stimuli to induce various target cognitive states in an operator. While presenting the stimuli, multimodal signals indicating physiological responses of the operator may be sampled. One or more of the state-classifiers are trained using, for example, supervised and/or unsupervised training techniques to map characteristics of the recorded physiological responses to the target cognitive state intended to be introduced by the presented stimuli.

Pre-existing systems did not train classifiers to use eye movement or tracking or other ocular attributes to predict cognitive state. This is because previously implemented eye movement sensors required that the subjects' heads be confined to a pre-determined volume. In a particular embodiment described herein, the system and process utilize recorded eye movements and/or other ocular attributes to capture cognitive processes and more accurately predict cognitive state. Embodiments disclosed herein do not require subjects' heads to be confined to a pre-determined volume. the process analyzes the data in real-time to assign or re-assign tasks between human operators and autonomous systems in a collaborative HAT fashion.

Figure 2:
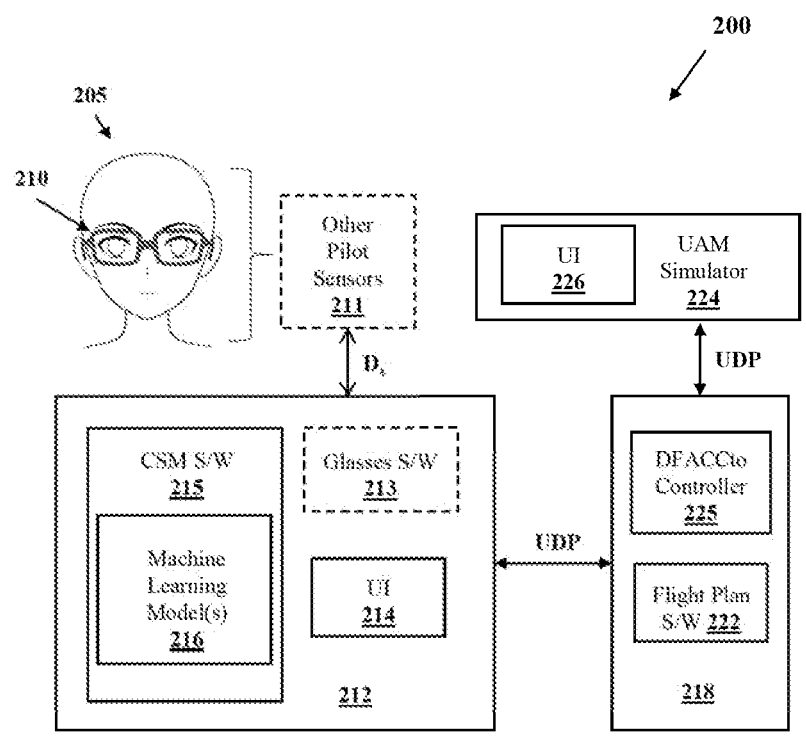
FIG. 2 is a block diagram of a system for operator status determination and task allocation, consistent with a particular embodiment of the present disclosure.

Certain embodiments relate to collecting sensor data as cognitive input to a classification model which may be used in invoking a contingency plan. As one example with reference to FIG. 2, an exemplary system 200 collects data (such as for example eye tracking data) as cognitive input to a classification model which has been trained to detect cognitive decline during a flight simulation and to invoke a contingency plan which may involve reliance on a high-level autonomous system. In FIG. 2 gaze tracking eye glasses 210 are worn by the human operator 205, e.g., pilot, during a simulated exercise. By way of example, the Tobii Pro glasses 2 eye tracker device (developed by Tobii Technology AB, Danderyd, Sweden) with 50 Hz sampling rate and a maximum total system latency of 10 ms was successfully used to record gaze data. The exemplary glasses include a recording device connected therewith. The data collected on the recording device may be retrieved using a wired or wireless connection, e.g., Bluetooth.

Data from the eye tracker 210 (and other physiological or psychophysiological pilot sensors 211) is retrieved/received by a first processor 212, e.g., a Windows machine which has CSM software 215, which may include machine learning models 216 instantiated thereon and a user interface UI 214. Sensor data $D_s$ may be communicated via wired or wireless protocols. By way of example, CSM software 215 collects data using a Python script from eye tracker 210 (and other psychophysiological pilot sensors 211) using the sensors' define protocols. The CSM 215 processes the sensor data $D_s$ in accordance with machine learning models 216 to determine pilot cognitive state and packages data into a free form data string stream for transmission to a second processor via User Datagram Protocol (UDP). A second processor 218, e.g., may include DFACCto Controller 225 as well as additional software programs 222 that may be used to acquire flight plans for the simulation. DFACCto Controller 225 may be implemented as a Qt application. A third processor may be coupled or include a UAM simulator machine 224 and UI 226. Machines 212, 218 and 224 in this example are on the same network, enabling the use of point-to-point UDP network communications. DFACCto Controller 225 provides connection and communication between the UAM simulator 224 and the CSM software 214 via, e.g., UDP messages, and performs user-defined actions such as notifications and/or control actions using, e.g., Common Image Generator Interface (CIGI) packets and handlers.

Processor 212 might be configured to execute tangible computer-readable instructions, e.g., software, such as software 213 specific to one or more sensors, such as the tracking glasses for presenting and/or processing received/retrieved gaze data and/or for facilitating configuration of the tracking glasses 210. By way of example, for the Tobii Pro glasses 2, Tobii Pro Studio software is installed. CSM software 215 on the processor 212 is used to capture eye movement data with the tracker glasses in real-time and to record the eye movement data for further processing purposes. The recorded eye movement and other ocular attribute data including, e.g., movement data such as gaze position, gaze direction, and pupil diameter, can be analyzed in real time using, e.g., a Support Vector Machine (SVM) classifier, to predict events. In one embodiment, this may be conducted with an event prediction model via installed machine learning methods.

Other psychophysiological sensors, such as sensors 211, may also be used to collect operator data for use in making collaborative decisions. The '526 patent, which is incorporated herein by reference, describes some non-limiting example systems and processes that may be used as part of processing psychophysiological sensor data to display the state of a human operator.

The system of FIG. 2 is part of a prototype vehicle-based HAT system integrated with a baseline UAM vehicle with custom avionics and control algorithms such as those described in Silva, C., et al., VTOL urban air mobility concept vehicles for technology development. In 2018 Aviation Technology, Integration, and Operations Conference 2018 (p. 3847), which is incorporated herein by reference. Specifically, an exemplary prototype vehicle is a six-passenger, quad-rotor vehicle, and the control algorithm is implemented using Python.

In a first testing scenario, the system of FIG. 2 is used to determine UAM pilot incapacitation, impairment, and/or combinations thereof. Embodiments may also dynamically respond thereto and allocate tasks. In the UAM simulator, the UAM pilot 205 wears the eye tracker 210, and the prototype UAM is programmed with a flight plan 222 to fly from point A to point B. Eye movement data is received at the CSM 215. Using the UAM simulator in manual mode, and while the pilot is flying the simulated vehicle following the flight path, if simulated incapacitation or impairment of the pilot is detected, a trained model 216 detects the incapacitation or impairment, the determination of pilot incapacitation or impairment is messaged to the DFACCto Controller 225 and a contingency plan is executed by the UAM simulator 224 responsive to instructions from the DFACCto Controller 225.

An incapacitated operator is assumed to be a vehicle operator who has lost consciousness or is experiencing microsleep. The UAM prototype simulator system was built such that if the pupil diameter cannot be measured for 5 seconds (non-normal $D_s$ data) by the eye tracker 210, at time $T_1$ the CSM 215 determines incapacitation or impairment and outputs an indication of such to the DFACCto Controller 225. For purposes of the incapacitation or impairment simulation, incapacitation may be demonstrated simply by the operator closing their eyes. It is envisioned that other methods, including pilot stick input behavior may be monitored and are reflective of incapacitation or impairment and can be used toward the allocation of functions.

In such an extreme crew state case of incapacitation, the CSM 215 may declare an emergency, e.g., by using the DFACCto Controller 225 to synthesize speech and to automatically broadcast the message to Air Traffic Control or others via the relevant radio or other electronic output channels; changes the flight path to the vertiport with the closest medical facility (by interfacing with and communicating directly with the flight navigation control run by the flight simulator 224 via DFACCto Controller 225) while the human would interface with this flight navigation control via a graphical user interface); sends a command to the flight simulator to switch control from manual to semi-automatic mode via DFACCto Controller 225. This is an example of a total takeover due to total incapacitation, versus a partial or sliding takeover of only certain/specific controls or functional tasks for optimization purposes (such as for being within a certain impairment threshold). Those skilled in the art will appreciate that thresholds may have multiple tiers and/or have one or more upper or lower limits.

The CSM 215 then receives back, via DFACCto Controller 225, an acknowledgement or rejection, depending on the current flight simulator mode and potentially upon operator dismissal of the takeover, e.g., the pilot is no longer incapacitated or meeting an incapacitated threshold and/or an impairment threshold (time $T_2$). This functionality of the CSM/DFACCto/Controller system enables the potential operator/pilot dismissal of the takeover (either a total takeover or a partial takeover in certain embodiments). The CSM/DFACCto/Controller system changes the graphical user interface 226 to display this status in the cockpit, and also provides an option to the operator by way of a button press for dismissal of the takeover, should the pilot/operator recover and choose to do so.

The flight simulation then proceeds to execute a safe and controlled landing (enabled by the prior emergency declaration communications) at the medical facility. DFACCto Controller 225 has the information for the closest medical facility in a database and will share that information, as well as the vehicle position and speed data which the DFACCto Controller 225 receives via UDP from vehicle (or simulator) 224, with CSM 215. CSM 215 then does some calculations using the received data and sends commands to DFACCto Controller 225. DFACCto Controller 225 then sends those commands to the UAM simulator (vehicle) 224 with instructions to land at the identified medical facility. The CSM/DFACCto/Controller system unlocks the flight controls, enabling flight by qualified or certified personnel once the medical needs of the pilot/operator are met. In other embodiments, enabling control or partial control may be enacted upon one or more other criterion being met.

Semi-automatic mode is used to signify that the vehicle is not going to follow the original flight path but instead will divert to a medical facility for the purposes of the safety of the pilot onboard who is now incapacitated. The controls are locked in this scenario due to the sensed and detected incapacitation (vs. inferred from a lack of control input or other non-direct indication). For a bad actor use case, the controls may be locked out without incapacitation. In yet other embodiments, portions of controls may be left enabled to mimic an error as opposed to a total lockout or enable others to assist guiding the vehicle. In still yet further embodiments, portions of the control may be left intact while more data is being collected/analyzed to determine whether it's a bad actor use case and/or a case of incapacitation and/or impairment.

Fully-automatic for the flight simulator may not be ideal in some instances, such as in bad actor situations, as the flight simulation navigation system would go back to following the originally-programmed flight path. Semi-automatic mode may allow for partial control to be "taken" from (functional tasks no longer assigned to) one team member (the human or the system) and "given" to the other for dynamic function allocation purposes. This dynamic and partial allocation enables the optimization moment-by-moment of individual functional tasks assigned across the team members. This optimization may be based on workload, safety, efficiency, or other factors of value in the AAM or UAM airspace environment. This disclosure also envisions taking partial control from one or more humans and/or automated control systems and reallocating various portions of the taken control amongst one or more different humans and/or control systems. It is also envisioned that in certain embodiments that one human and/or automated control system have certain control tasks removed from them while gaining one or more tasks.

Figure 3A:
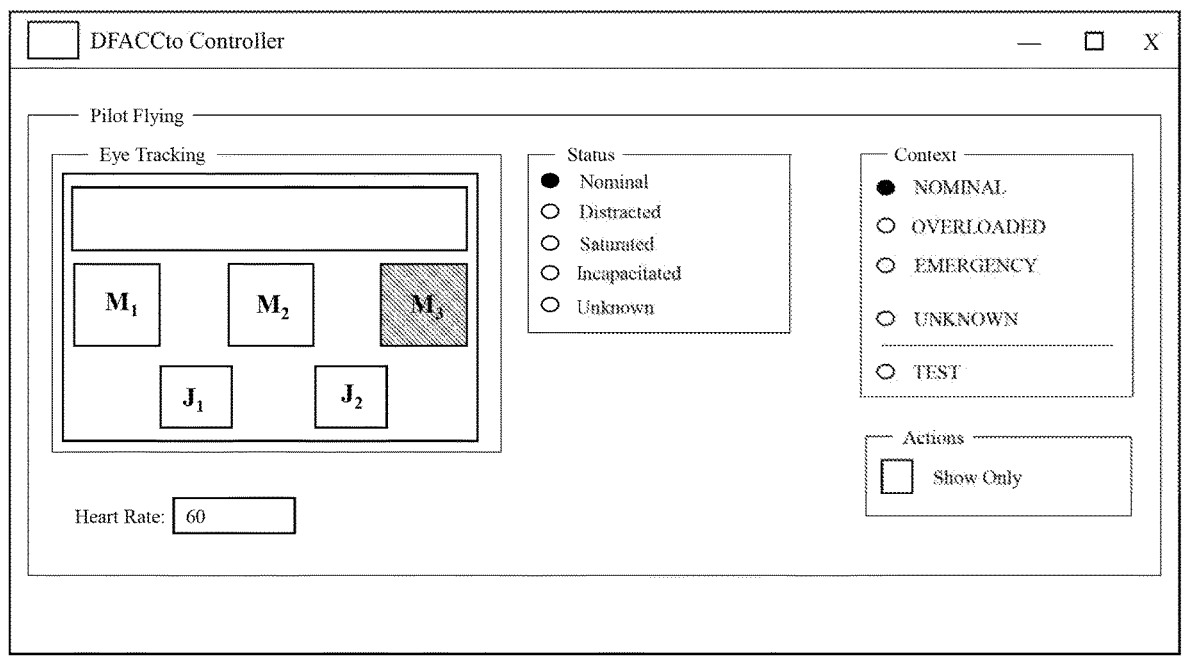
FIG. 3A is an exemplary screen shot indicating a first status of a vehicle operator determined in accordance with the system of FIG. 2.
Figure 3B:
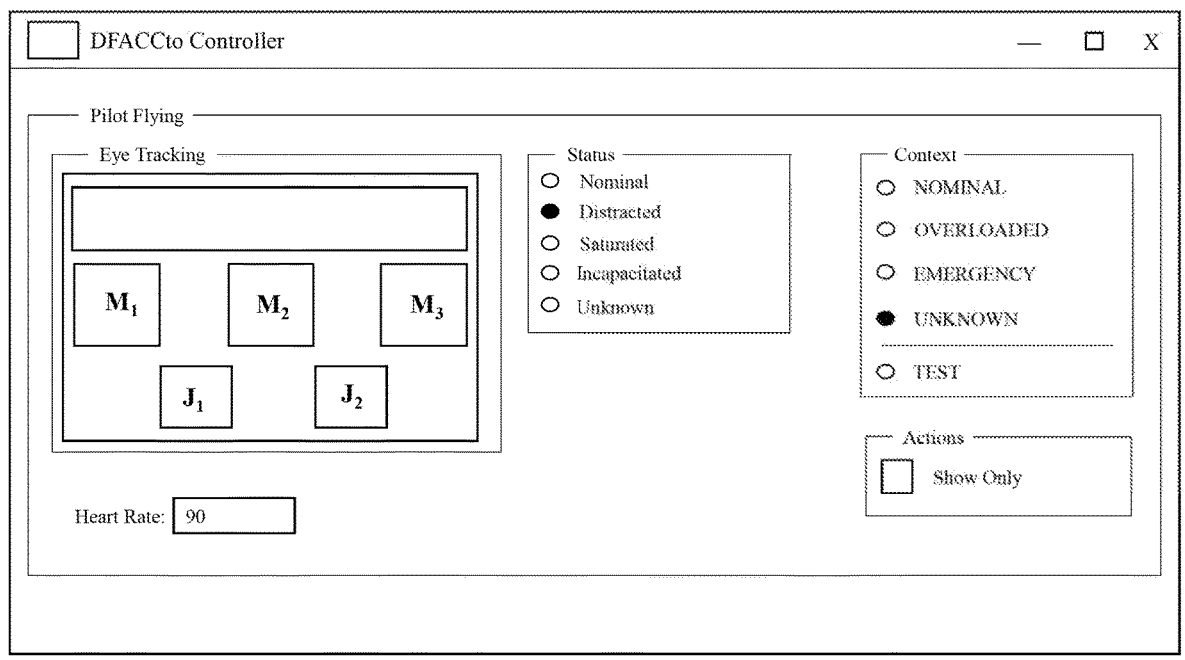
FIG. 3B is an exemplary screen shot indicating a second status of a vehicle operator determined in accordance with the system of FIG. 2.

In a second testing scenario, the system of FIG. 2 is used to determine when/if an operator is distracted. A distracted operator is assumed to be a vehicle operator 205 who appears to be visually distracted from vehicle operator tasks as detected by the eye tracker 210. This scenario can occur, for example, if the operator is handling an off-nominal vehicle event, inclement weather, or a passenger medical situation. A distracted operator may be detected by using information such as gaze position and gaze direction data recorded by the eye tracker 210. In the second testing scenario, there were five devices of interest in the UAM simulated vehicle 224 including three monitors ($M_1$, $M_2$, $M_3$) and two joysticks ($J_1$, $J_2$). An instantiated machine learning model 216 is trained such that if the operator is looking somewhere other than those five devices, the event would be predicted as distracted. For this scenario, the prototype system 200 was programmed such that if the gaze data from eye tracker 210 is different from the system's trained model data, the SVM 216 would classify that event as distracted. FIGS. 3A and 3B provide exemplary UI screenshots from the DFACCto Controller showing pilot flying status determined from eye tracking sensor data from the CSM 215. In FIG. 3A, the eye tracking data shows that the pilot is looking at one of the five expected devices, i.e., $M_3$ and status and context are shown as nominal. Whereas in FIG. 3B, status is indicated as distracted since the eye tracking data shows that the pilot is not looking at any of the five devices of interest. The mitigation process for classification of an operator as distracted invokes DFACCto Controller 225 to request that UAM simulator 224 simulate autonomous control of the aircraft wherein the vehicle mode changes to automatic mode from manual mode and automation executes the existing operation plan, e.g., 222. Note that in this example, the automation continues with the existing flight plan. This is different from the semi-automatic mode described in the first scenario, wherein the automation required a change to the original flight plan.

In this case, the system 200 will perform the mode change command and, if appropriate, hold the command until superseded by the operator 205. Since the system is dynamic and continuously collecting the operator's eye gaze data and other psychophysiological data, the system may be programmed such that once distraction is no longer sensed, vehicle mode is returned to manual and the operator is back in command. This distraction scenario was demonstrated simply by using an eye tracker and the operator not looking at the devices of interest for at least 5 seconds. Additionally heart rate variability, finger plethysmogram amplitude, and perspiration behavior may be sensed to assess operator workload or other cognitive or physical status. Other methods, including multi-modal classifications using galvanic skin response and pre-processed electroencephalography and brain electrical activity, and surveys on autonomous nervous system responses may also be incorporated to detect an overloaded operator which may be mitigated with the allocation of functional tasks.

In the case of incapacitation or severe impairment or types of impairment, additional information may be needed to autonomously land the aircraft safely and to optimize a positive outcome. This information could include the hospital's location or emergency communication policies, and possibly other data regarding the operator's status using different sensors, e.g., electrocardiogram, in addition to the eye tracker.

The user interface (UI) 214 is implemented using Qt toolkit and Qt Modeling Language (Qt/QML), a UI markup language to handle declarative aspects that uses JavaScript or other high-level languages to handle imperative aspects. Voice communication is also incorporated into the system since it can be used as a backup communications system. Analog voice communications can be used for safety-critical exchanges. As referenced above, UDP is used to transport vehicle data, emergency navigation data, weather data, and other messages by and between the primary modules.

One skilled in the art recognizes that the distribution of various software and processing steps across three machines as described with respect to FIG. 2, is not so limited. Additional or fewer machines may be used in accordance with space, processing power and/or security requirements.

In the first embodiment and related testing scenarios described above, the concept of inclusion of some level of intelligence or system decision-making using measured operator status of a UAM vehicle is explored. Although the embodiment described above primarily used oculometry and eye tracking as the psychophysiological sensor data for detecting pilot incapacitation, impairment or distraction, numerous other types of sensors are also useful in predicting human cognitive and/or physical conditions. By way of example, exemplary EEG devices which detect electrical neurological brain activity include: the 24-channel advance brain monitoring (ABM); the 4-channel Muse device by InteraXon; the g-Tec device by Guger and the Epoc by Emotiv. Exemplary functional near infrared spectroscopy (fNIRS) devices for optical hemodynamic brain activation detection include: Nirex by Biopac with 16 channels and frequency domain systems such as Imagent by ISS, Inc. Exemplary electrocardiogram (ECG) devices for sensing electrical heart beats include the 3-point Nexus Mark II system and the 2-point Muse or ABM systems; Exemplary galvanic skin response (GSR) and electrodermal activity (EDA) devices measure sympathetic nervous system arousal with a NeXus-10 MKII system from Mind Media or the Empatica watch. Blood volume pulse can be detected optically with the Empatica watch or FitBit. Respiration can be detected with devices such as the strain gauge belt with the Nexus Mark II system or the belt-worn force-measurement device by Spire. Oculometry and eye tracking including pupil size, gaze point and head tracking can be sense by, e.g., headworn Tobii Pro Glasses. U.S. Pat. Nos. 10,192,173 and 10,997,526 provide various examples related to the training of classification algorithms using sensor data to predict pilot state and the use of classifications in allocating tasks between humans and automation. One skilled in the art will appreciate that there are numerous indicators of operator distraction, impairment or incapacitations which may be determined from one or a combination of sensor results. The examples provided herein are in no way intended to be limiting.

In a second embodiment, concepts described above are applied to the design, development, testing and evaluation of space-based vehicle simulators to enable current and future space missions, e.g., moon to Mars missions. Objectives include: evaluate, develop, and validate methods and guidelines for identifying human-automation/robot task information needs, function allocation, and team composition for future long duration, long distance space missions; develop design guidelines for effective human-automation-robotic systems in operational environments that may include distributed, non-co-located adaptive mixed-agent teams with variable transmission latencies; quantify overall human-automation-robotic system performance to inform and evaluate system designs to ensure safe and efficient space mission operations; and identify and scope the critical human-automation/robotic mission activities and tasks that are required for future long duration, long distance space missions.

Figure 4:
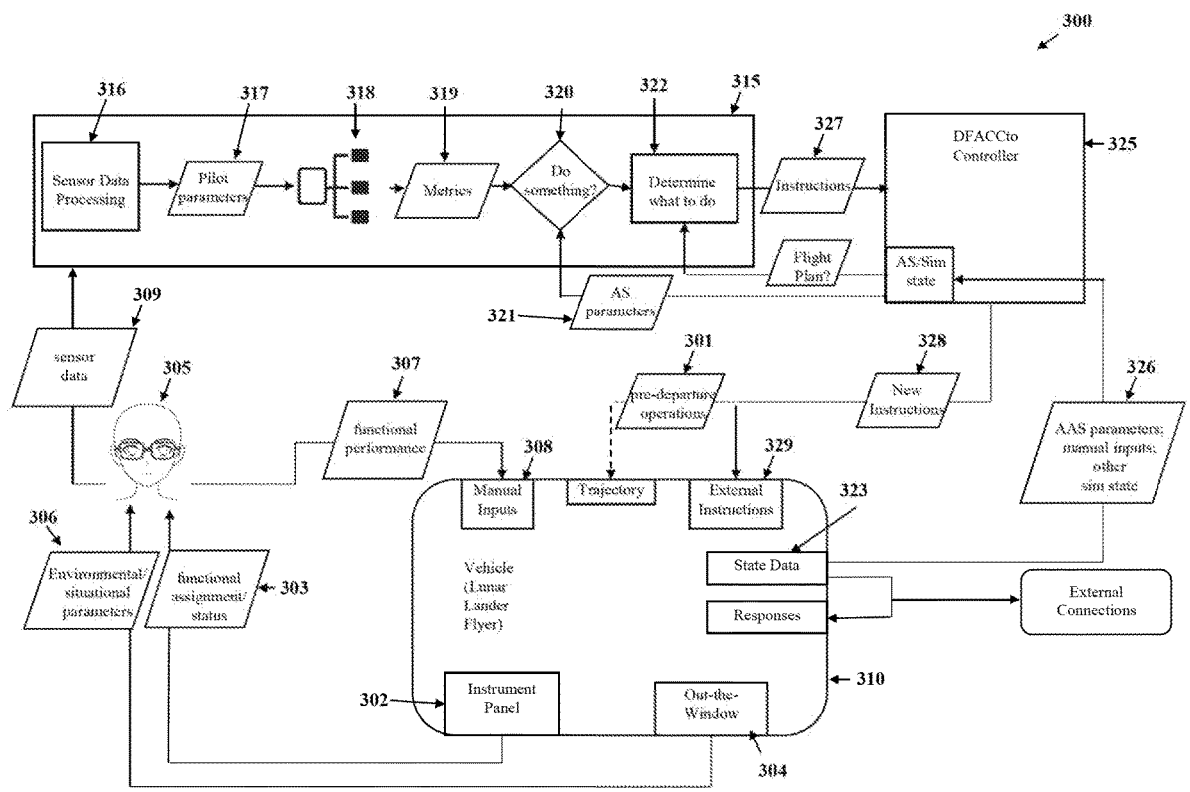
FIG. 4 is a detailed block diagram of a system for operator status determination and task allocation, consistent with a particular embodiment of the present disclosure.

FIG. 4 provides a detailed dual purpose schematic showing primary components, as well as data and instruction flow of an exemplary prototype lunar lander (simulated or actual) operating within a DFA framework 300.

From the perspective of the pilot or pilots 305, the pilot(s) receive input visually from an instrument panel 302 in the vehicle 310 (simulated or actual), e.g., functional assignments and vehicle status 303, and from out-the-window (OTW) sources 304, e.g., environmental and situational information 306 they see or is generated from OTW sources. Although not shown, auditory information may also be communicated to the pilot(s) and from the pilots(s). The pilot(s) functional performance 307 is monitored and received at manual inputs 308 as the pilot(s) 305 interact manually with the vehicle, e.g., via instrument panel switches, toggles, buttons, touchscreen, joysticks, etc. The pilot(s)' physiological and/or psychophysiological status is collected using one or more of the sensors discussed above and retrieved/received as sensor data 309 by CSM 315.

At the CSM 315, the sensor data 309 is processed using appropriate signal and imaging platforms 316 such as, for example, NeuroPype having nodes written in Python and using lab streaming layer (LSL) protocol. The processed sensor data is output as pilot(s) parameters 317 which can be input to one or more trained ML models 318 to determine existence of decision-point metrics 319, e.g., are predetermined thresholds exceeded (eyes close too long? Heartrate too high/too low? Gaze not on one of critical components for too long?). The decision-point metrics inform whether something needs to done; action needs to be taken 320. Also input to the determination as to whether to take action is data on what is available to take action, i.e., what autonomous system (AS) components and/or parameters 321 are available. When it is decided that something should be done, the next decision is what to do 322, e.g., control or functional task allocation change, warning or alert, diversion, etc. The CSM 315 communicates these "what to do" instructions to the DFACCto Controller 325.

The DFACCto Controller 325 also receives state data 323 (e.g., adaptive autonomous system (AAS) parameters, manual inputs and other simulator data 326) from the vehicle 301 which is passed from the DFACCto Controller 325 to the CSM 315 to inform both the decision that something needs to be done 320 and to inform the decision regarding what action(s) to take 322. DFACCto Controller 325 receives instructions 327 from the CSM 315 and communicates new instructions 328 to the vehicle 301. As discussed above, these new instructions 328, received as external instructions 329, can dynamically allocate (or reallocate) tasks between the pilot(s) 305 and autonomous capabilities of the vehicle (or simulator) 310 that may differ from the pre-departure operations allocations 301 in response to real-time changes to pilot status.

Figure 5:
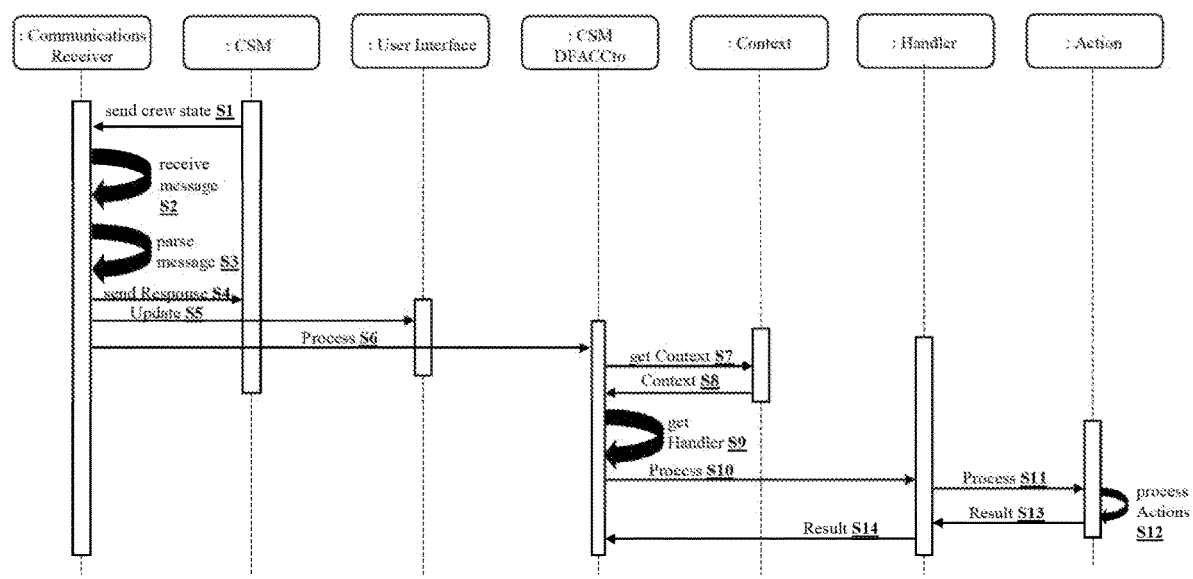
FIG. 5 is a sequence flow of a Dynamic Function Allocation Control Collaboration Protocol (DFACCto) controller consistent with various embodiments of the present disclosure.

At the heart of the DFA framework for human-autonomy teaming and collaboration in the present embodiments is the Dynamic Function Allocation Control Collaboration Protocol (DFACCto) embodied in a DFACCto Controller as discussed above. The DFACCto Controller implements CSM instructions and allocates and/or reallocates tasks between pilot(s) and the AAS of the vehicle/simulator. FIG. 5 represents an exemplary sequence diagram for DFACCto Controller communications during a simulation exercise. At S1, a communications receiver of the DFACCto controller receives a message from the CSM with instructions in accordance with monitored crew state. The DFACCto controller receives S2 and parses the message S3, sends a receipt response S4 to the CSM, provides any updates to UI resulting from message instructions S5, and processes the instructions S6. Processing the instructions in accordance with the protocol (DFACCto) includes requesting S7 and receiving S8 Context; getting handler S9; processing handler request S10; processing request for handler to process action S11, processing action by handler 512 and receiving result of processed action at handler 513 and returning result of process action 514.

Certain embodiments are directed to a computer program product (e.g., nonvolatile memory device), which includes a machine or computer-readable medium having stored thereon instructions which may be executed by a computer (or other electronic device) to perform these operations/activities.

Although several embodiments have been described above with a certain degree of particularity, those skilled in the art could make numerous alterations to the disclosed embodiments without departing from the spirit of the present disclosure. It is intended that all matter contained in the above description or shown in the accompanying drawings shall be interpreted as illustrative only and not limiting. Changes in detail or structure may be made without departing from the present teachings. The foregoing description and following claims are intended to cover all such modifications and variations.

Various embodiments are described herein of various apparatuses, systems, and methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Reference throughout the specification to "various embodiments," "some embodiments," "one embodiment," "an embodiment," or the like, means that a particular feature, structure, or characteristic described in connection with the embodiment is included in at least one embodiment. Thus, appearances of the phrases "in various embodiments," "in some embodiments," "in one embodiment," "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features structures, or characteristics of one or more other embodiments without limitation.

Any patent, publication, or other disclosure material, in whole or in part, which is said to be incorporated by reference herein is incorporated herein only to the extent that the incorporated materials do not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

What is claimed is:

1. A computer-implemented method of allocating one or more tasks to one or both of a human operator and one of an automated, autonomous or semi-autonomous system, the method comprising:
   determining, by a first processor, a first cognitive or physical state of the human operator at a first time $T_1$;
   determining, by the first processor based on the first cognitive or physical state, that a change in task allocation between the human operator and the one of an automated, autonomous or semi-autonomous system is required;
   providing, by the first processor, a first data packet containing the determination of the first cognitive state of the human operator and first instructions to implement a change in task allocation to a processor-based communications controller to implement the change in task allocation; and
   receiving, at the processor-based communications controller, the first packet from the first processor and
   i. confirming receipt of the first packet to the first processor,
   ii. parsing the first packet to retrieve the first cognitive or physical state and the first instructions,
   iii. providing a second packet including instructions for generating a visual indication of the first cognitive or physical state and a request to implement the first instructions to a processor-based vehicle control system, wherein the processor-based vehicle control system includes a visual user interface and the one of an automated, autonomous or semi-autonomous system;
   receiving, at the processor-based vehicle control system, the second packet from the processor-based communications controller and
   iv. parsing the second packet to retrieve the instructions for generating a visual indication of the first cognitive or physical state and the request to implement the first instructions,
   v. displaying the visual indication of the cognitive or physical state on the visual user interface,
   vi. processing the request to implement the first instructions, and
   vii. implementing the first instructions, including the change to task allocation.

2. The method of claim 1, wherein allocating one or more tasks to the one of an automated, autonomous or semi-autonomous system includes implementing one of a fully-automatic mode wherein the one of an automated, autonomous or semi-autonomous system implements a predetermined operational plan and a semi-automatic mode wherein one of an automated, autonomous or semi-autonomous system implements a revised operational plan.

3. The method of claim 2, wherein when the first cognitive or physical state of the human operator at first time $T_1$ is determined to be incapacitated, the semi-automatic mode is implemented.

4. The method of claim 2, wherein when the first cognitive or physical state of the human operator at first time $T_1$ is determined to be impaired, the semi-automatic mode is implemented.

5. The method of claim 4, wherein the semi-automatic mode includes re-assignment of one or more functional tasks to the one of an automated, autonomous or semi-autonomous system.

6. The method of claim 1, wherein the determining, by a first processor, the first cognitive or physical state of the human operator at a first time $T_1$ results in a determination that the human operator is in a state of impairment and not a state of incapacitation, the method further comprising:
   based on the determination of impairment, implementing a semi-automatic mode.

7. The method of claim 6, wherein the first and second data packets communicated in accordance with the User Datagram Protocol (UDP), and wherein at least the second data packet is formatted in accordance with the Common Image Generator Interface (CIGI) protocol.

8. The method of claim 1, wherein the first cognitive or physical state of the human operator is determined by the first processor using sensor data received from one or more physiological or psychophysiological sensors selected from the group consisting of: an electroencephalogram (EEG) sensor, event-related potentials (ERP) sensor, functional near infrared spectroscopy (fNIRS) sensor, electrocardiogram (EKG) sensor, heart rate sensor, blood pressure sensor, respiration rate sensor, skin temperature sensor, galvanic skin response (GSR) sensor, electromyogram (EMG) sensor, eye tracking sensor, eye movement sensor, ocular attribute sensor, voice stress analysis sensor, facial feature analysis sensor, and combinations thereof.

9. The method of claim 8, wherein the first cognitive or physical state of the human operator is a medical state.

10. The method of claim 9, wherein the medical state of the human operator is determined by the first processor using at least data comprising: eye tracking, eye movement and ocular attributes of the human operator.

11. The method of claim 10, wherein the first processor receives sensor data indicating one or more of; duration of time the human operator's eyes have been shut and whether the human operator is looking at or has looked at one or more displays of the visual user interface with a certain period of time.

12. The method of claim 8, wherein the first cognitive or physical state of the human operator is a medical state.

13. The method of claim 1, further comprising:
   receiving, at the processor-based communications controller, a third packet indicating that the processor-based vehicle control system is not going to implement the change in task allocation prior to implementing the first instructions, parsing the third packet to retrieve the indication that the change in task allocation is not going to be implemented and generating a fourth packet for communicating to the first processor that the change in task allocation is not going to be implemented.

14. The method of claim 13, wherein the third packet is generated responsive to information from the human operator generated at time $T_2$.

15. A system for allocating one or more tasks to one or both of a human operator and one of an automated, autonomous or semi-autonomous system, the system comprising:
a first processor configured for:
receiving physiological or psychophysiological sensor data for the human operator,
determining a cognitive or physical state of the human operator at a time $T_1$,
determining if the human operator's cognitive or physical state at time $T_1$ the requires a change task allocation between the human operator and the one of an automated, autonomous or semi-autonomous system, and
providing a data packet containing the determination of the cognitive or physical state of the operator and a set of instructions to implement the change in task allocation;
a processor-based control system, including manual or other human-interface controls operable by the human operator and or the one of an automated, autonomous or semi-autonomous system; and
a processor-based communications controller configured for receiving the data packet from the first processor and
i. confirming receipt of the data packet to the first processor,
ii. parsing the data packet to retrieve the first cognitive or physical state and the first instructions,
iii. providing a second packet including instructions for generating a visual indication of the first cognitive or physical state and a request to implement the first instructions to a processor-based vehicle control system, wherein the processor-based vehicle control system includes a visual user interface and the one of an automated, autonomous or semi-autonomous system;
wherein the processor-based control system is configured, in accordance with a predetermined protocol, for receiving the second packet from the processor-based communications controller and
iv. parsing the second packet to retrieve the instructions for generating a visual indication of the first cognitive or physical state and the request to implement the first instructions,
v. displaying the visual indication of the cognitive or physical state on the visual user interface,
vi. processing the request to implement the first instructions, and
vii. implementing the first instructions, including the change to task allocation.

16. The system of claim 15, wherein the first processor, the processor-based control system and the processor-based communications controller are on the same network.

17. The system of claim 15, wherein the predetermined protocol uses data packets communicated in accordance with the User Datagram Protocol (UDP).

18. The system of claim 17, wherein at least a portion of the data packets are formatted according to the Common Image Generator Interface (CIGI) protocol.

19. The system of claim 15, wherein the processor-based control system further includes at least one of a visual user interface or an auditory user interface.

20. A computer system for implementing a dynamic function allocation control collaboration protocol within a vehicle or robotic control environment, the computer system comprising:
one or more processors; and
one or more computer-readable media that includes programmed instructions that, when executed by the one or more processors, cause the computer system to perform operations, the operations comprising:
receiving data packets in a first format containing the determination of a cognitive or physical state of a human operator within the vehicle or robotic control environment and instructions to implement a change in task allocation between the human operator and one of an automated, autonomous or semi-autonomous system within the vehicle or robotic control environment;
confirming receipt of data packets in the first format to the sending entity and parsing the data packet to retrieve the cognitive or physical state and the instructions,
preparing data packets in a second format including instructions for generating a visual indication of the cognitive or physical state and a request to implement the instructions and for sending the data packets in the second format to a vehicle or robotic control system of the vehicle or robotic control environment;
implementing the change in task allocation between the human operator and the one of an automated, autonomous or semi-autonomous system within the vehicle or robotic control environment; and
confirming receipt of data packets in the second format by the vehicle or robotic control system and at least one of confirmation of implementation of the change in task allocation between the human operator and the one of an automated, autonomous or semi-autonomous system or an indication that the change in task allocation is not going to be implemented by the vehicle or robotic control system.

\* \* \* \* \*